(12) United States Patent
Laudel et al.

(10) Patent No.: US 6,657,986 B1
(45) Date of Patent: Dec. 2, 2003

(54) VARIABLE CLOCK RATE CORRELATION CIRCUIT AND METHOD OF OPERATION

(75) Inventors: Kennan Laudel, Campbell, CA (US); Inchul Kang, Los Gatos, CA (US)

(73) Assignee: Hyundai Electronics America, San Jose, CA (US)

( * ) Notice: Subject to any disclaimer, the term of this patent is extended or adjusted under 35 U.S.C. 154(b) by 0 days.

(21) Appl. No.: 09/348,729

(22) Filed: Jul. 6, 1999

Related U.S. Application Data
(60) Provisional application No. 60/092,374, filed on Jul. 10, 1998.

(51) Int. Cl.[7] ............................................. H04B 1/707
(52) U.S. Cl. ...................... 370/342; 370/441; 370/442; 375/208; 375/209
(58) Field of Search ............................... 342/145, 189, 342/70; 370/540, 441, 442, 465, 466, 342; 715/501; 375/208, 152

(56) References Cited

U.S. PATENT DOCUMENTS

| | | | | |
|---|---|---|---|---|
| 4,553,251 A | * | 11/1985 | Hartmann ................... 375/114 |
| 4,558,422 A | * | 12/1985 | DenBeste ................... 364/179 |
| 4,901,307 A | * | 2/1990 | Gilhousen ................... 370/18 |
| 5,268,927 A | | 12/1993 | Dimos et al. ................. 375/1 |
| 5,361,276 A | | 11/1994 | Subramanian ................ 375/1 |
| 5,422,909 A | | 6/1995 | Love et al. ................. 375/202 |
| 5,539,730 A | | 7/1996 | Dent ........................... 370/29 |
| 5,566,168 A | | 10/1996 | Dent ........................... 370/50 |
| 5,570,349 A | | 10/1996 | Bustamante et al. .......... 370/18 |
| 5,596,600 A | | 1/1997 | Dimos et al. ............... 375/206 |
| 5,640,416 A | * | 6/1997 | Chalmers .................... 375/206 |
| 5,715,516 A | | 2/1998 | Howard et al. ............ 455/33.1 |
| 5,724,041 A | * | 3/1998 | Inoue .......................... 342/70 |
| 5,812,522 A | | 9/1998 | Lee et al. ................... 370/206 |
| 5,856,998 A | * | 1/1999 | Durrant ...................... 375/208 |
| 5,898,728 A | | 4/1999 | Sentz et al. ................. 375/202 |
| 6,111,899 A | * | 8/2000 | Van Hoogenbemt ........ 370/540 |
| 6,202,167 B1 | * | 3/2001 | Lai et al. .................... 713/501 |
| 6,289,041 B1 | * | 9/2001 | Krasner ...................... 375/152 |

\* cited by examiner

*Primary Examiner*—William Trost
*Assistant Examiner*—Brandon J. Miller
(74) *Attorney, Agent, or Firm*—Townsend and Townsend and Crew LLP

(57) ABSTRACT

A variable rate correlation circuit for conserving power includes a variable clock source, a local PN source, and a correlator. The local PN source further includes a local generator and a resampler. The variable clock source provides a normal clock rate and a lower clock rate. The local generator supplies the local PN sequence at the normal clock rate. The resampler receives the local PN sequence sampled at the normal clock rate and outputs the local PN sequence sampled at the lower clock rate. The correlator receives the lower sampled local PN sequence, the received PN sequence, and the lower clock rate signal, correlating the received and local PN sequences at the lower clock rate to produce a. correlated result.

16 Claims, 5 Drawing Sheets

Basic Code Tracking Loop - Delay-Lock Loop

FIG. 5

VARIABLE CLOCK RATE CORRELATION CIRCUIT AND METHOD OF OPERATION

CROSS REFERENCE TO RELATED APPLICATIONS

This application claims the benefit of U.S. Provisional Application No. 60/092,374, entitled "A Variable Clock Rate Correlation Circuit and Method of Operation," filed Jul. 10, 1998.

Further, the following applications are herein incorporated by reference in their entirety for all purposes:

"AN IMPROVED CDMA TRANSCEIVER AND FREQUENCY PLAN," Ser. No. 09/113,603, filed Jul. 10, 1998; and "AN IMPROVED CDMA RECEIVER AND METHOD OF OPERATION," Ser. No. 09/113,791, filed Jul. 10, 1998.

BACKGROUND OF THE INVENTION

This invention relates to a correlation circuit, and more particularly, to a variable clock rate correlation circuit for use in a portable CDMA receiver.

Correlation circuits are commonly used in portable telecommunications receivers for identifying which transmission among many signals is intended for the particular receiver. The correlation circuit generates a locally generated signal and compares that local signal to the received signal. When the received signal and the locally generated signal have a high degree of correlation, the transmission is deemed to be intended for the receiver. When the resulting correlation is low, the transmission is deemed not intended for the receiver and discarded. The received and locally generated signals may be either analog signals, such as those used in FM telecommunications systems, or sequences of binary data in digital systems such as Code Division Multiple Access (CDMA) systems.

Correlation circuits are used throughout the receiver, including in the carrier lock loop and delay lock loop circuitry of the receiver. A carrier lock loop (CLL) is used to remove the carrier offset frequency and phase of the received signal. A delay lock loop (DLL) is used to maintain signal lock, i.e., maintain the alignment between the received and locally generated signals once the received signal has been acquired.

Figure 1A:
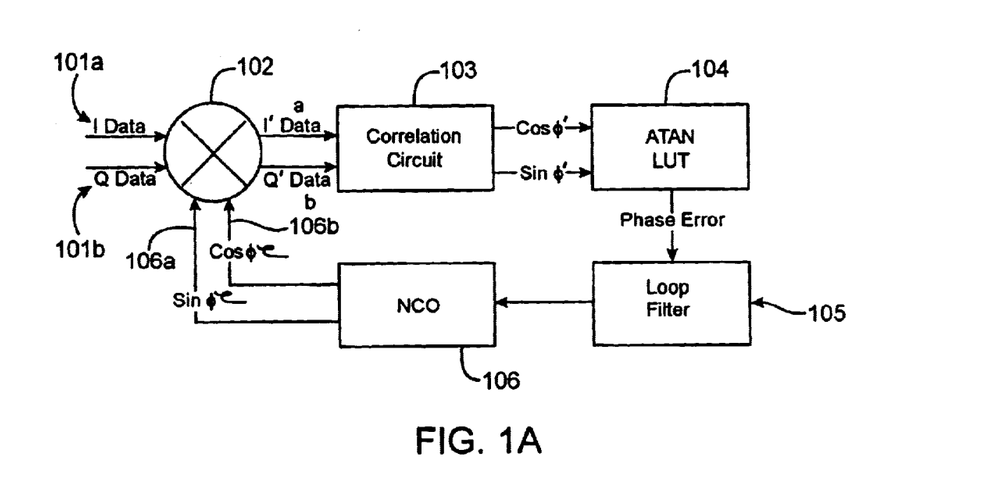
FIG. 1A illustrates a known circuit architecture for a carrier lock loop for a digital CDMA receiver.

FIG. 1A illustrates a system block diagram of a carrier lock loop (CLL) for a digital CDMA receiver. The CLL includes a complex multiplier 102, a correlation circuit 103, an arc-Tangent look up table (ATAN LUT) 104, a loop filter 105, and a numerically controlled oscillator (NCO) 106. Using a CDMA receiver front end (not shown), a CDMA signal is received and downconverted to baseband I and Q data sequences 101a and 101b.

The I and Q data sequences 101a and 101b are supplied to the complex multiplier 102 with complex multipliers sin($\Phi$) 106a and cos($\Phi$) 106b. The complex multipliers 106a and 106b operate to remove the carrier frequency and phase offset from the carrier signal. The I and Q data sequences 102a and 102b are correlated with locally generated sequences (not shown), producing complex phase error components cos($\Phi$)' 101a and sin ($\Phi$)' 103b. The complex phase error components 103a and 103b are supplied to an Arc-tangent look-up table 104, which produces a phase error signal 105a. The phase error signal 104a is a measure of how closely aligned the received I and Q data carrier offset phase is to the locally generated phase ($\Phi$). The phase error will be minimum when the received carrier phase and $\Phi$ are aligned.

A loop filter 105 removes any spurious out-of-band signal components from the phase error signal 103a. The phase error signal is supplied to a numerically controlled oscillator (NCO) 106, which in response produces an improved set of complex multipliers 106a and 106b.

Figures 1B, 1C, 1D, 1E, 1F:
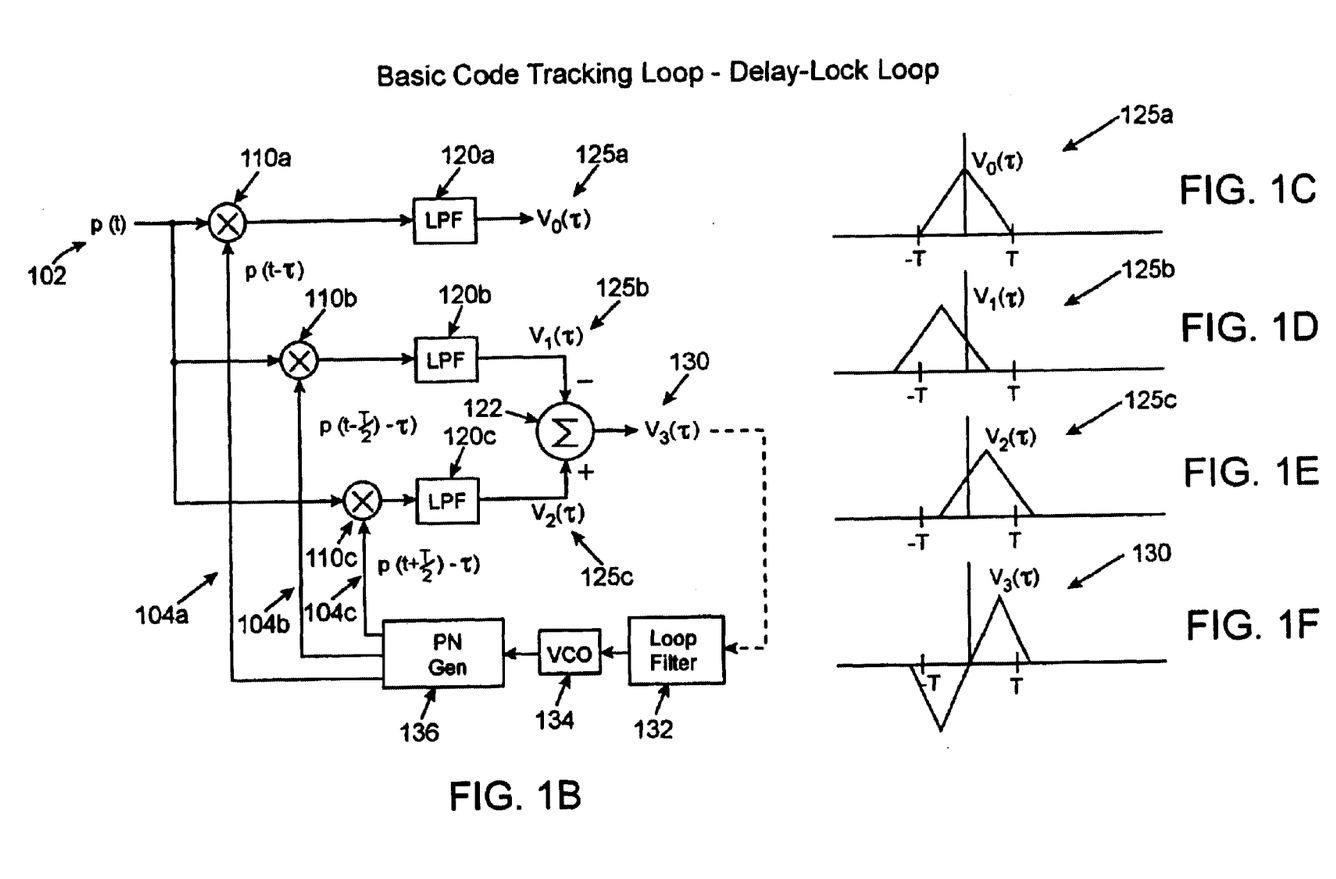
FIG. 1B illustrates known circuit architecture for a CDMA Delay Lock Loop.
FIGS. 1C–1F illustrate the response of the CDMA delay lock loop shown in FIG. 1B.

Once the received sequence is matched to the local PN sequence, the alignment between the two sequences must be closely maintained. FIG. 1B illustrates a block diagram of a delay lock loop for dynamically maintaining alignment between the received and local PN sequences once the two sequences are within a predefined range. The delay lock loop 100 includes correlators 110a–c, filters 120a–c, an adder 122, a loop filter 132, a voltage controlled oscillator (VCO) 134, and a local pseudo-normal (P-N) code generator 136. A received chip sequence 102 is concurrently supplied to correlators 110a–c. The PN generator 136 generates a three local PN sequences 104a–c. The first local PN sequence 104a is punctual with the received PN sequence 102. The correlator 110a produces the response shown in FIG. 1C.

When the alignment between the received PN sequence and the Local PN sequence are varied from −T to T, the second local PN sequence 104b is late with respect to the received PN sequence 102, thereby generating the output response 125 shown in FIG. 1D. The third local PN sequence 104c is early with respect to the received PN sequence 102 generating an output response 125c which is shown in FIG. 1E. The early and late versions of the received and locally generated sequences are typically used in the correlation circuits, as shown below.

An adder 122 is used to sum a negated version of the late response with the early response to generate an error signal 130, shown in FIG. 1F. As shown in FIG. 1F, the error signal 130 has a linear voltage level versus time response over the correlation period ±T/2. Once the locally generated and received sequences are within this range, the DLL dynamically realigns them until the error signal 130 reaches zero, indicating perfect alignment between the two.

A loop filter 132 removes spurious noise from the error signal 130 which may occur during the correlation process. The filtered error signal is supplied to the VCO 134, which generates a tone corresponding to the error signal 130. The local PN generator 136 receives the VCO tone, and in response, adjusts the timing of its internally generated local PN sequences 104a–c, either advancing or delaying the local PN sequences 104a–c according to error signal response of FIG. 1F. The adjusted local PN sequences 104a–c are then output to the correlators 110a–c to obtain a higher degree of correlation with the received PN sequence.

Correlation circuits consume power primarily as a function of its operating speed or correlation rate. A correlation circuit operating at a high clock rate consumes more power than the correlation circuit operating at a lower clock rate.

In conventional receiver circuitry such as the aforementioned CLL and DLL, the correlation rate is maintained at a constant clock rate, typically many times higher than the chip rate of the received signal or sequence. The cumulative effect of a large number of correlation circuits operating at a relatively high clock rate results in a significant consumption of power. In light of the limited power supply available to portable cellular telephones, the present method of operating the correlation circuits become very disadvantageous.

What is needed is a new correlation circuit and method of operation which allows a reduction in the clock rate and accordingly, a decrease in power consumption.

SUMMARY OF THE INVENTION

The present invention provides for a variable clock rate correlation circuit which conserves power by operating at two different clock rates. During initial signal acquisition, the variable clock rate correlation circuit operates at a high clock rate, 2 or more times the chip rate to correlate the received and locally generated sequences for a possible match. Once the received and local generated sequences exhibit a high degree of correlation, the relative positioning of the received and locally generated sequences is known to a large degree. The variable clock rate correlation circuit then switches to a lower clock rate, less than twice the chip rate, reducing the amount of power it consumes, while maintaining a high degree of time alignment accuracy.

In one embodiment, the correlation circuit includes a variable clock source, a local PN source, and a correlator. The local PN source further includes a local generator and a resampler. The variable clock source provides a normal clock rate and a lower clock rate. The local generator supplies the local PN sequence at the normal clock rate. The resampler receives the local PN sequence sampled at the normal clock rate and outputs the local PN sequence sampled at the lower clock rate. The correlator receives the lower sampled local PN sequence, the received PN sequence, and the lower clock rate signal, correlating the received and local PN sequences at the lower clock rate to produce a correlated result.

A further understanding of the nature and advantage of the invention herein may be realized by reference to the remaining portions of the specification and attached drawings.

DESCRIPTION OF THE PREFERRED EMBODIMENT

Figure 2:
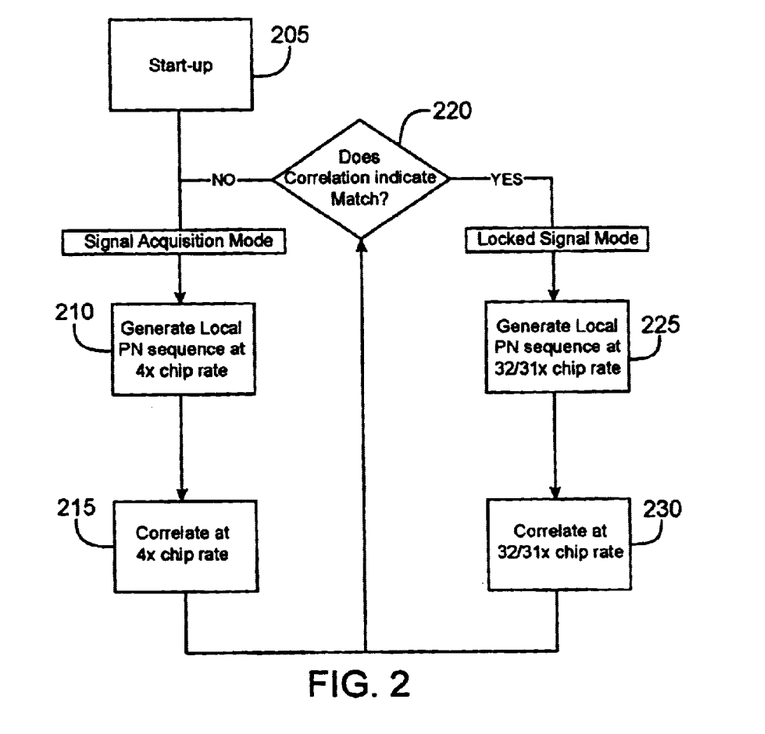
FIG. 2 illustrates a flowchart describing the operation of the variable clock rate correlation circuit in accordance with the present invention.

FIG. 2 illustrates a flow chart describing the operation of the variable clock rate correlation circuit in accordance with the present invention. During start-up 205 or any other period when a prior correlation between a received and a locally generated PN sequence has not occurred, the correlation circuit initially operates in an acquisition mode. During acquisition mode operation, a local PN generator generates a local PN sequence which is sampled at a high clock rate compared to the received PN sequence (step 210). In the preferred embodiment, the local PN sequence is sampled at 4x the chip rate of the received PN sequence. Once sampled, the local PN sequence and the received PN sequence are supplied to a correlator. The correlator correlates the two sequences at a high clock rate, preferably at the 4 times ("4x") the chip rate used in sampling the local PN sequence (step 215). If the resulting cross-correlation product indicates that the received and local PN sequences are not within the ±T/2 correlation range shown in FIG. 1B, the correlation circuit operates in the acquisition mode again as described above, performing steps 205 and 215.

If the cross-correlation product indicates that the local and received sequences are within the ±T/2 correlation range, the two sequences can be aligned and the correlation circuit switches to a locked signal mode of operation. In the locked signal mode, the positioning of the received sequence is known to a large degree, i.e., within ±1/2 of a chip period. Consequently, the correlation between the received and local sequences can occur at a reduced clock rate with little or no error resulting therefrom. When the correlation circuit operates in the locked signal mode, the correlation clock rate is reduced, preferably from the 4x chip rate during the acquisition mode to (32/31)x chip rate during the locked mode.

When the correlation circuit operates at the reduced clock rate, the local PN sequence must be resampled at the reduced clock rate in order for the correlation circuit to produce an accurate cross-correlation product. Accordingly, the local sequence is resampled at the reduced clock rate, preferably (32/31)x the chip rate of the received PN sequence (step 225). The resampled local sequence is correlated with the received sequence at the reduced clock rate producing a cross-correlation product (step 230). If the resulting cross-correlation product indicates alignment between the two sequences within a predefined range, the correlation circuit continues to operate in the locked signal mode during the subsequent sample period. If the cross-correlation product is outside of the predefined range, the correlation circuit switches to the signal acquisition mode, described above.

Figure 3:
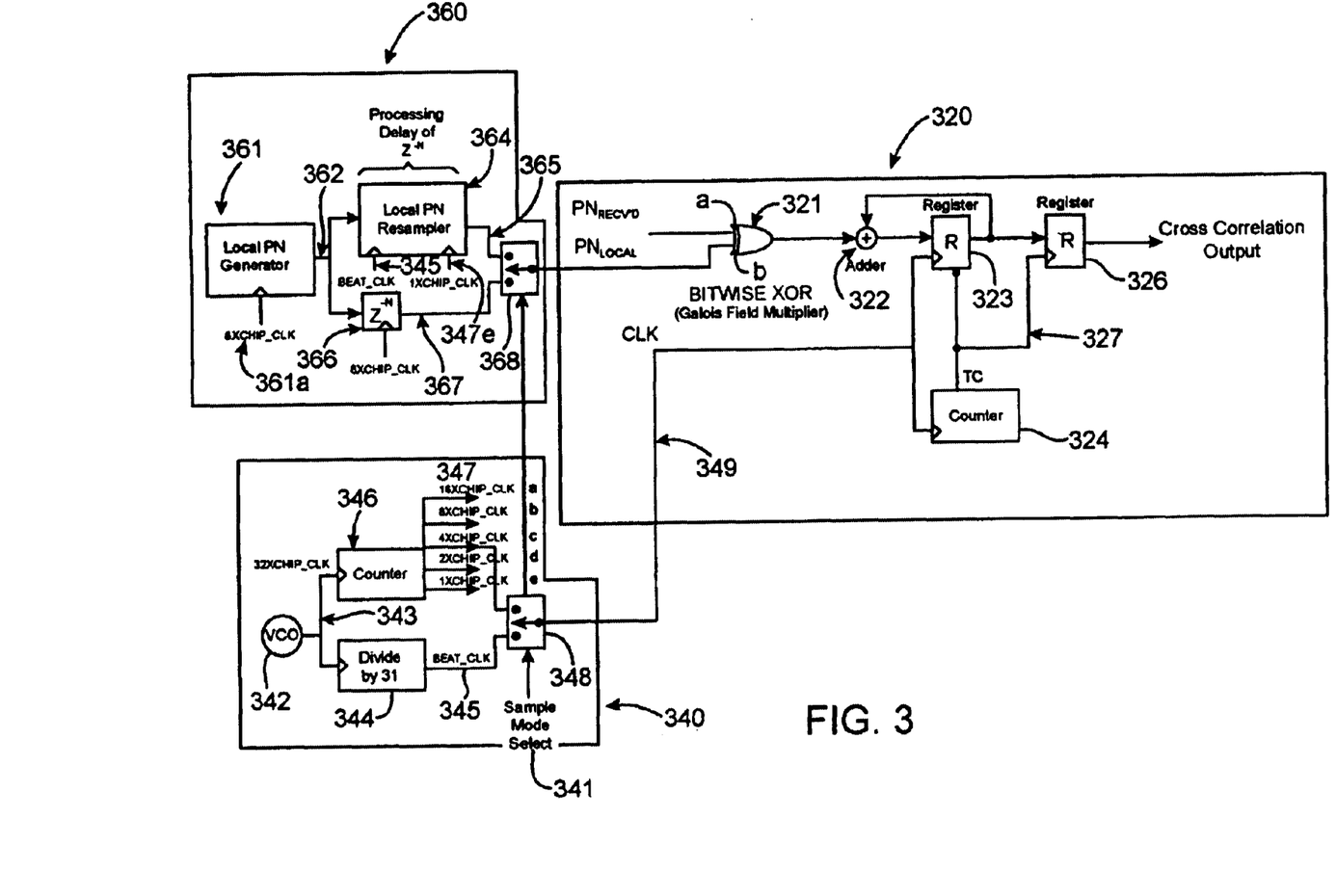
FIG. 3 illustrates an exemplary embodiment of the variable clock rate correlation circuit in accordance with the present invention.

FIG. 3 illustrates one embodiment of the variable clock rate correlation circuit in accordance with the present invention. The correlation circuit includes a correlator 320, a clock source 340, and a local PN source 360.

The correlator 320 includes a bitwise exclusive or (XOR) operator 321 having a first input 321*a* to receive the received PN chip sequence and a second input 321*b* to receive the local PN chip sequence. The received sequence is represented by an offset two's complement number, preferably of 10-bit length representing a value from −512 to +512. The XOR operator 321 performs a cross correlation upon the two sequences, producing a large cross-correlation product when the two sequences are aligned. The result of each correlation is summed by an adder 322, and a running sum of previous correlations occurring within the same clock period is stored in register 323. A counter 324 running at a clock rate CLK 349 counts down from N−1 to 0 at which time the terminal count signal 327 goes high, thereby activating register 326 to output the accumulated result over the N samples.

The CLK signal 349 is generated by a clock source 340. The clock source 340 includes a voltage controlled oscillator (VCO) 342, a divide-by-31 circuit 344, a counter 346, and a sample mode select switch 348. The VCO 342 provides a reference signal 343 to the counter 346 and the divide-by-31 circuit 344. In the preferred embodiment, the reference signal operates at a frequency of 32x the chip rate (1.2288 MHz), or 39.3216 MHz. The divide-by-31 circuit 344 generates a beat clock signal 345 equal to (32/31)x chip rate, further discussed below. From the 32x reference frequency 343, the counter 346 generates 1x, 2x, 4x, 8x, and 16x clock signals 347*a–e*.

Responsive to a control signal 341, a clock source switch 348 selects either the beat clock 345 or one of the counter rates 347*a–e* as the clock rate CLK used for the lo correlation rate. In the preferred embodiment, the beat clock rate is (32/31)x the chip rate and the 4x chip rate is used as the second input of the clock source switch 348, although other clock rates may be used.

The local PN (LPN) source 360 includes a LPN is generator 361, a LPN resampler 364, a LPN signal delay 366, and a LPN switch 368. The LPN generator 361 receives a clock signal 361a and produces the local PN chip sequence 362. The clock signal 361a is used to advance or delay the beginning of the local sequence 362 in fractional intervals of the clock rate, which in the preferred embodiment is 8x the chip rate.

The local sequence 362 is supplied to the LPN resampler 364 and to the LPN signal delay 366. The LPN signal delay 366 operates as an N-period delay to compensate for the delay occurring in the LPN resampler 364. The delayed sequence 367 is supplied to the LPN switch 368 for input into the correlator 320, if selected by the LPN switch 368. In the preferred embodiment, the delayed sequence 367 is selected for input into the correlator's LPN input 321b during operation in the signal acquisition mode.

The LPN resampler 364 also receives the local PN sequence 362, a 1x chip rate clock signal 347e, and the beat clock signal 345. The 1x chip rate clock signal 347e is used to provide a reference clock signal to the resampler. The beat clock signal 345 is the reduced clock rate at which the local PN chip sequence 362 is resampled. In the lock signal mode, the LPN resampler 364 samples the local sequence at the reduced rate, (32/31)x chip rate in the preferred embodiment, producing a resampled local sequence 365. The resampled local sequence 365 is routed to the correlator's LPN input 321b via the LPN switch 368. In the signal acquisition mode, the delayed sequence 367 is supplied to the correlator's LPN input 321b via the LPN switch 368. In an alternative embodiment, the LPN resampler may also include a bypass feature to route the local PN sequence 362 delayed by an appropriate time period to the LPN switch 368 during the signal acquisition mode, thereby obviating the need for the signal delay 366.

Figure 4:
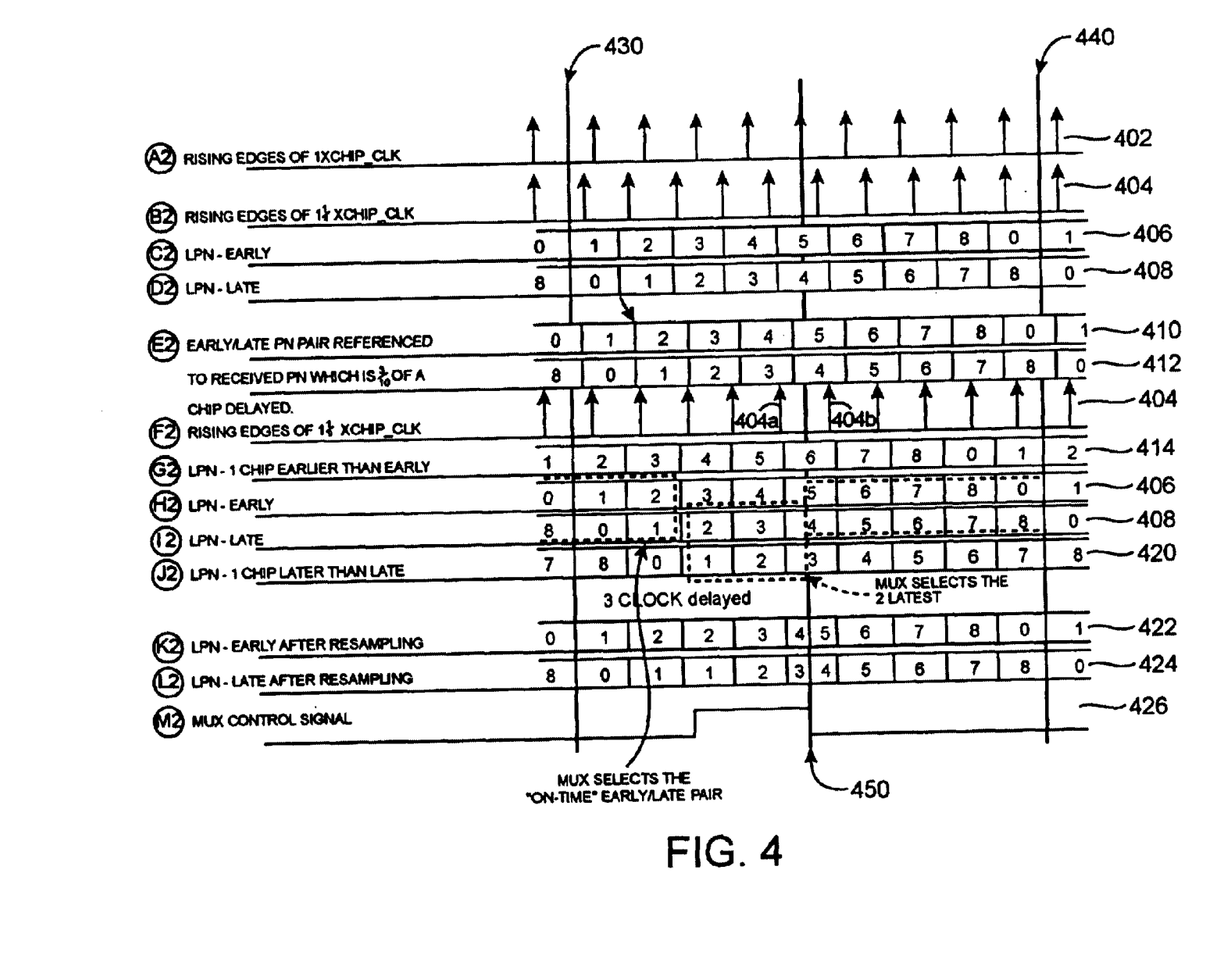
FIG. 4 illustrates a timing diagram useful in understanding the operation of the LPN resampler.

FIG. 4 illustrates a timing diagram useful in understanding the operation of the LPN resampler 364. A first pulse train 402 represents the rising edges of the 1x chip rate clock, the rate at which chips are generated within and output from the LPN generator 361. For purposes of illustration, the first pulse train is shown as 1x the chip rate, but can be Nx the chip rate in other embodiments.

A second pulse train 404 represents the beat clock, which is shown for purposes of illustration as (10/9)x chip rate. This rate is derived from the master clock using a divide-by-9 function and is the reduced sampling rate at which the local PN sequence 362 is sampled and correlated with the received PN sequence once alignment between the received and local sequences is established. In the preferred embodiment, the beat clock is (32/31)x chip rate derived from the master clock (VCO) 342 and the divide-by-31 circuit 344 (FIG. 3).

The points at which the 1x chip rate pulse and the beat clock pulses simultaneously occur form boundary lines 430 and 440. These boundary lines 430 and 440 define frames of the LPN chip sequences shown. A mid-frame boundary line 450 occurs at the center of each frame.

Correlation circuits operate using early and late versions of the local and received sequences. The early and late versions of each can be generated using a tapped delay line, described below. Chip sequences 406 and 408 are early and late versions of the local PN sequence 365 (FIG. 3), advanced or delayed by one half of a chip relative to punctual.

The early/late received PN chip sequences are shown as sequences 410 and 412, respectively. The received sequences 410/412 are shown delayed in relation to the local sequences in FIG. 4, as described in greater detail below.

When the local and received sequences are perfectly aligned, the LPN resampler will produce a "resampled" local sequence which is identical to the received PN sequence 410/412, but sampled at the beat clock rate 404 instead of the original clock rate 402. The early/late versions of the resampled local sequence is shown as sequences 422/424. The resampled local sequences 422/424 are then supplied to the correlator (320, FIG. 3), and are correlated, at the beat clock rate, with early/late versions of the received PN sequence to ascertain the degree of correlation therebetween. By way of Example in FIG. 4, applying the beat clock 404 (F2) to the early/late chip pairs of the received PN sequences 410/412 (E2) produces the following chip pairs: (1,0), (2,1), (2,1), (3,2), (4,3), (5,4), (6,5), (7,6), (8,7), (0,8). The chip pair (2,1) would be selected twice since the second beat clock occurs at the transition point and in the preferred embodiment the next occurring chip pair is selected when the beat clock occurs at a transition point.

However, the local and received sequences may not be perfectly aligned. This is the case shown in FIG. 4 in which the local sequences 406/408 are misaligned (advanced) 3/10 of a chip period with respect to the received sequences 410/412. If the two sequences are correlated while misaligned, the resulting correlation cross product would be erroneous. The LPN resampler must therefore produce the aforementioned early/late chip pairs of the perfectly aligned local sequences 422 and 424 when sampled at the beat clock rate 404. The LPN resampler accomplishes this by initially generating additional local PN sequences. The LPN resampler then selectively chooses chips from among the generated local PN sequences to reconstruct the aforementioned early/late chip pairs corresponding to the perfectly aligned early/late local PN sequences.

In the preferred embodiment, the LPN resampler generates two additional PN sequences; an earlier PN sequence 414 and a later PN sequence 420. The earlier and later PN sequences 414 and 420 are advanced/delayed one chip compared to the early/late sequences 406 and 408. The earlier, early, late, and later versions of the local PN sequences are preferably generated by means of a delay line tapped at appropriate points to provide the aforementioned chip offset. Additional PN sequences having the same or different chip offset periods may alternatively be used.

Once the four PN sequences are generated, the LPN resampler selectively chooses between the four PN sequences 414, 406, 408, and 420 to yield the aforementioned early/late PN chip pairs corresponding to the perfectly aligned early/late local PN sequence. A multiplexer receives the earlier, early, late, and later PN sequences 414, 406, 408, and 420. The beat clock 404 activates the multiplexer at the beat clock rate. A mux control signal 426, further described below, controls the selection of chip pairs from the four PN sequences 414, 406, 408, and 420.

During the first beat clock after the frame boundary 430, the (1,0) chip pair is selected from the early/late PN sequences 406/408. This selection is consistent with the aforementioned early/late chip pair of the perfectly aligned local PN sequences. During the second beat clock period, the (2,1) chip pair is selected again from the early and late PN sequences 406/408. During the third beat period, the (2,1) chip pair from the late and later PN sequences 408/420 is selected. The selection is correct since the perfectly aligned local PN sequence also produces the redundant (2,1) early/late chip pair, as shown above. The (3,2) chip pair is selected from the late/later PN sequences 408/420 during the fourth beat period.

During the mid-frame period, (the 5th chip period in the exemplary embodiment of FIG. 4 and the 16th chip period in the preferred embodiment), two beat clock pulses 404a and 404b occur. During this period, the mux control signal 426 operates at 2x the chip rate to output two chip pairs (4,3) and (5,4) sampled by the beat clock. The two beat clock pulses 404a and 404b occur during the mid-frame period due to the beat clock's slight oversampling. To accurately reconstruct the perfectly aligned early/late PN sequence listed above, the (4,3) chip pair is selected as the first output and the (5,4) chip pair is selected as the second output during this period. The chip selection process continues as previously described. In this manner, the resampled early/late local PN sequences 422/424 are constructed having chip pairs which match the chip pairs of the perfectly aligned early/late local PN sequences, described above.

Figure 5:
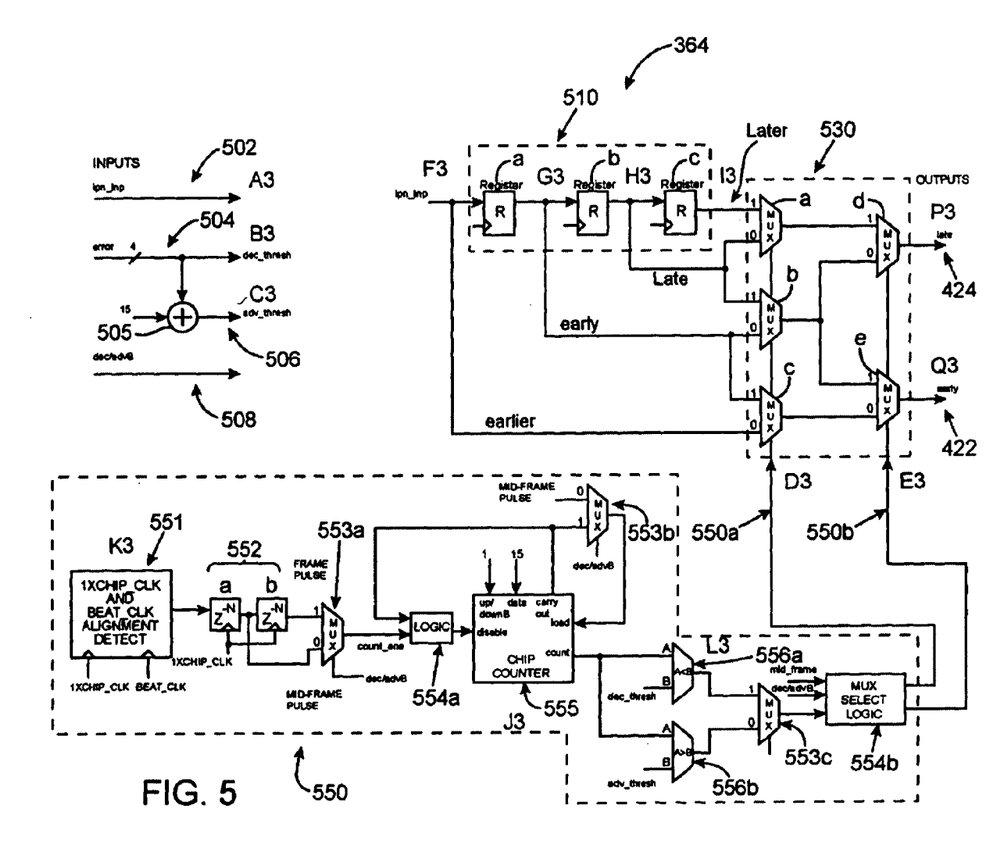
FIG. 5 illustrates an exemplary embodiment of the LPN resampler in accordance with the present invention

FIG. 5 illustrates one embodiment of the LPN resampler 364. The LPN resampler 364 includes a tapped delay line 510 for providing the four local PN sequences 414, 406, 408, and 420, a multiplexer 530 for outputting the resampled early/late PN sequences 422 and 424, and control circuitry 550 for controllably selecting the appropriate chip pair from the 4 LPN sequences.

Three signals are received into the LPN resampler 364: the local PN sequence 502, an error signal 504, and a dec/advB signal 508. The local PN sequence 502 is provided by the LPN generator 364, described above. The error signal 504 and the dec/advB signal 508 are provided by the delay lock loop (DLL) (FIG. 1B) described above, and define the fractional chip misalignment between the received and local sequences, 3/10 of a chip period in the exemplary embodiment of FIG. 4. In the preferred embodiment, the error/dec_thresh signal 504 is a 4-bit number indicating the magnitude of the DLL's error signal 130 (FIGS. 1B and 1F) and represents N/32 of a chip period. The dec/advB signal 508 is a one bit signal representing the sign of the DLL's error signal 130 (FIGS. 1B and 1F), indicating if the frame of the received PN chip sequence is delayed (−T) or advanced (+T) relative to the frame of the local PN sequence 502. These two signals allow the correlation circuit to operate within ±1/2 of a chip period range as described in FIG. 1F. An adder 505 is used to generate adv_thresh signal 506 by combining a value 15 to the error/dec_thresh signal 504.

In the preferred embodiment, the tapped delay line 510 includes 3 serially connected registers 510a–c, each of which process the local sequence with a one chip period delay to generated the local sequences 414, 406, 408, and 420 (FIG. 4). The output of each register 510a–c is tapped and connected to the multiplexer 530.

The multiplexer 530 in the preferred embodiment consists of five, dual input multiplexers 530a–e, as shown. The multiplexers 530a–c each receive two versions of the local sequence, one version delayed one chip period compared to the other. A first mux control signal 550a selects between the is outputs of each of the three multiplexers 530a–c. These three outputs and a second mux control signal 550b are input to the multiplexers 530d–e. Responsive to the second mux signal 550b, the two multiplexers 530d–e output the correct early/late local sequences 422 and 424 (FIG. 4).

The resampler control circuitry 550 is used to controllably select the correct chip pair from the four local sequences. In the preferred embodiment, the resampler control circuitry 550 includes an alignment circuit 551, signal delays 552a–b, multiplexers 553a–c, logic circuits 554a–b, a chip counter 555 and comparators 556a–b.

The alignment circuit 551 detects when the pulses of the 1x chip clock and the beat clock are coincident and, in response, generates the first boundary signal 430 (FIG. 4), described above. Signal delays 552a–b generate the mid- and end-of-frame boundary pulses 450 and 440. The mid- and end-of-frame pulses 450 and 440 are supplied to a first mux 553a. The dec/advB signal controls the first mux 553a to output an end of frame boundary signal 450 when the dec/advB signal is high and a mid-frame pulse when the dec/advB signal is low.

A chip counter 555 is loaded with a count value equal to N, where $1/[2*(N+1)]$ is the maximum resolution allowed to correctly align the chip pairs. In the exemplary embodiment of FIG. 4 where the local and received PN sequences are misaligned 3/10 of a chip, the count value is 4. In the preferred embodiment, the count value is 15.

When the dec/advB 508 is a logical high, the chip counter 555 counts down from N to zero starting at the beginning of a frame. The count value is subsequently supplied to first and second comparators 556a–b. The first comparator 556a tests whether the count value is less or equal to than the dec_thresh value and if so, a high signal is output. The second comparator 556b tests whether the count value is greater than the adv_thresh, and if so, a high signal is output. In response to the dec/advB signal 508, a third mux 553c selects between the first and second comparator signals. The comparator's output pulse, the mid-frame pulse and the dec/advB signals are supplied to the mux select logic circuit 554b, which outputs two mux control signals 550a and 550b. The mux control signal 550a is determined by the state of the dec/advB signal 508. In the preferred embodiment, if dec/advB 508 is high, the mux signal 550a selects chip pairs from the sequences 406/408 or 408/420. If dec/advB is low, chips pairs from the sequences 414/406 and 406/408 are selected. The mux signal 550b is the aforementioned mux control signal 426 of FIG. 4 and has a duration of [X+0.5] chips, where X represents the fraction chip misalignment (dec_thresh value), 2.5 chips in the exemplary embodiment of FIG. 4.

The above described process continues until the chip counter reaches zero. Once the chip counter 555 counts down to zero, the counter 555 loads the count value and disables itself until it receives the next frame boundary, at which time it repeats the process, assuming dec/advb remains high.

While the above is a complete description of the preferred embodiments of the invention, various alternatives modifications and equivalence may be used. For instance, the above-described correlation circuit may be easily modified to operate within analog communication systems. The earlier, early, late, and later versions of the received signal in the analog domain may be realized using phase delays instead of signal delays shown. It should be evident that the present invention is equally applicable by making appropriate modifications to the embodiments described above. Therefore, the above description should not be taken as limiting the scope of the invention which is defined by the metes and bounds of the appended claims.

What is claimed is:

1. A method for correlating a received signal with a locally generated signal at a first clock rate during a signal acquisition mode, and at a second clock rate during a locked signal mode using a correlation circuit the method comprising the steps of:

operating in said signal acquisition mode, comprising the steps of:
providing said received sign;
generating, at said first clock rate, said first local signal;
correlating, at said first clock rate, said received signal with said first local signal to produce a fist cross-correlation product, said first cross-correlation product indicating that said received signal and said first local signal are aligned within a predefined range; and
after said received signal and said first local signal are aligned within the predefined range, operating in said locked signal mode, comprising tee steps of:
providing said received signal;
generating, at said second clock rate, a second local signal, wherein the second clock rate is less than the first clock rate; and
correlating, at said second clock rate, said received signal with said second local signal to produce a second cross correlation product, wherein the correlation circuit consumes less power correlating said received signal with one of said local signals at said second clock rate than at said first clock rate.

2. The method of claim 1, wherein said local and received signals comprise digital PN sequences, each of which comprise a plurality of chips.

3. The method of claim 2, wherein said step of generating said second local signal comprises the stop of:
resampling said second local PN sequence at said second clock rate, said step of resampling comprising the steps of:
providing an early version of said second local PN sequence;
providing an earlier version of said second local PN sequence;
providing a late version of said second local PN sequence;
providing later version of said second local PN sequence;
selecting, at said second clock rate, a plurality of chips from said early, said earlier, said late, and said later versions of said second local PN sequence, the timing of said selected pair correlating with the timing of said second received PN sequence sampled at said second clock rate.

4. The method of claim 3, wherein said steps of providing said first clock rate comprises the step of providing a clock rate of M samples per chip and said step of providing said second clock rate comprises the step of providing a clock rate of (N+1)/N samples per chip.

5. The method of claim 4, wherein said M equals 4 and said N equals 31.

6. A correlation circuit for correlating at variable clock rates a received signal with a local signal, the correlation circuit comprising:
a clock source for providing a first clock rate and a second clock rate, wherein the fir clock rate is greater than the second clock rate;
a local PN source, comprising:
a local PN generator for supplying said local signal, wherein said local signal is provided at said first clock rate;
a resampler having a first input coupled to receive said local signal and a second input coupled to receive said second clock rate, said resampler providing said local signal at said second clock rate; and
a switch coupled to receive said local signal provided at said first clock rate and said local signal provided at said second clock rate; and a correlator having a first input coupled to receive said received signal, a second input coupled to receive said local signal provided at said first clock rate and said local signal provided at said second clock rate from said switch, and a third input coupled to receive said first clock rate and said second clock rate,
wherein said correlator produces a first correlated result of said received signal and said local signal at said first clock rate during a signal acquisition mode, and a second correlated result of said received signal and said local signal at said second clock rate during a signal lock mode, said correlation circuit consuming less power in said signal lock mode than in said signal acquisition mode.

7. The correlation circuit of claim 6, wherein said local and received signals comprise digital PN sequences, each of said PN sequences comprising a plurality of chips.

8. The correlation circuit of claim 7, wherein said local PN source further comprises:
a N-period signal delay having a first input coupled to receive said local PN sequence generated at said first clock rate, said N-period signal delay outputting said local PN sequence at said first clock rate delayed N sample periods; and
a first switch having a first input coupled to said signal delay, a second input coupled to said resampler, a third input for receiving a control signal, and an output coupled to said second input of said correlator.

9. The correlation circuit of claim 7, wherein said resampler comprises:
a delay line having an input coupled to receive said local PN sequence and a plurality of outputs for providing a plurality of delayed versions of said local PN sequence;
a multiplexer circuit having a plurality of signal inputs coupled to said delay line for receiving said plurality of said delayed versions of said local PN sequence, at least one control input for receiving mux control signals, and a plurality of signal outputs for outputting a plurality of chips from ad received and delayed versions of said local PN sequence, said outputted chips corresponding to chips of a local PN sequence which is aligned with said received PN sequence; and
control signal a control circuit coupled to said multiplexer for supplying said mux control signal to said multiplexes.

10. The correlation circuit of claim 9, wherein said delay line comprises:
a first register having an input coupled to receive said local PN sequence and a first delayed output, said first register having a predefined delay associated therewith; and
a second register having an input coupled to said output of said first a register and a second delayed output, said second register having a predefined delay associated therewith, and
a third register having an input coupled to said output of said second register and a third delayed output, said second register having a predefined delay associated therewith.

11. The correlation circuit of claim 10, wherein said multiplexes comprises:
a first mux bank comprising:
a first multiplexer having a first input coupled to receive said local PN sequence, a second input coupled to said first delayed output, a first mux control input, and a first mux output;

a second multiplexer having a first input coupled to said first delayed output, a second input coupled to said second delayed output, a second mux control input, and a second mux output;

a third multiplexer having a first input coupled to said second delayed output, a second input coupled to said third delayed output, a third mux control input, and a third mux output; and a second mux bank comprising:

a fourth multiplexes having an input coupled to said first mux output, a second input coupled to said second mux output, a fourth mux control input, and a first chip output;

a fifth multiplexer having an input coupled to said second mux output, a second input coupled to said third mist output, a fifth mux control input, and a second chip output.

12. The correlation circuit of claim 11, wherein said control circuit comprises:

alignment circuitry coupled to receive said local PN sequence, said alignment circuitry detecting the magnitude of chip misalignment between said received PN sequence and said local PN sequence, and in response producing a count value;

a chip counter coupled to receive said count value, said chip counter providing a control signal in response to said count value; and logic circuitry coupled to receive said control signal, producing, in response, a first mux signal cowled to said first, said second, and said third mux control inputs and a second mux control signal coupled to sad fourth and said fifth mux control inputs.

13. In a CDMA receiver for processing CDMA data, a correlation circuit for correlating, at variable clock rates, a received CDMA PN sequence with a local PN sequence, the correlation circuit comprising:

a clock source for providing a first clock rate and a second clock rate, wherein the first clock rate is greater an the second clock rate;

local PN source, comprising:

a local generator for supplying said local signal, wherein said local sign is provided at said first clock rate;

resampling means having a first input coupled to receive said local signal and a second input coupled to receive said second clock rate, said resampler means for providing said local signal at said second clock rate; and a switch coupled to receive said local signal provided at said first clock rate and said local signal provided at said second clock rate; and a correlator having a first input coupled to receive said received signal, a second input coupled to receive said local signal provided at said first clock rate and said local signal provided at said second clock rate from said switch, and a third intput coupled to receive said first clock rate and said second clock rate, wherein said correlator produces a first correlated result of said received signal and said local signal at said first clock rate, and a second correlated result of said received signal and said local signal at said second clock rate, said correlation circuit consuming less power producing the second correlated result than producing the first correlated result.

14. The correlation circuit of claim 13, wherein said resampling means comprises:

sequence delay means having an input coupled to receive said local PN sequence and a plurality of outputs for providing a plurality of delayed versions of said local PN sequence;

multiplexing means having a plurality of signal inputs coupled to said delay line for receiving said plurality of said delayed versions of said local PN sequence, at least one control input for receiving mux control signals, and a plurality of signal outputs for outputting a plurality of chips from said received and delayed versions of said local PN sequence, said outputted chips corresponding to chips of a local PN sequence which is aligned with said received PN sequence, and control circuit means coupled to said multiplexing means for supplying said mux control signal to said multiplexing means.

15. The correlation circuit of claim 14, wherein said sequence delay means comprises;

a first delay means having an input coupled to receive said local PN sequence and a first delayed output, said first register have a predefined delay associated therewith;

a second delay means having an input coupled to said output of said first delay means and a second delayed output; and a third delay means having an input coupled to said output of said second delay means and a third delayed output.

16. The correlation circuit of claim 15, wherein said control means comprises:

sequence alignment means for detecting the magnitude of chip misalignment between said received PN sequence and said local PN sequence;

counting means coupled to said sequence alignment means for providing a control signal in response to said detected misalignment; and logic circuitry means coupled to said counting means and to said multiplexing means for providing, in response to said control signal, a mux control signal to said multiplexing means for selecting said outputted chips.

* * * * *